United States Patent
Han (10) Patent No.: US 8,466,855 B2
(45) Date of Patent: Jun. 18, 2013

(54) PIXEL AND ORGANIC LIGHT EMITTING DISPLAY DEVICE USING THE SAME

(75) Inventor: Sam-Il Han, Yongin (KR)

(73) Assignee: Samsung Display Co., Ltd., Giheung-Gu, Yongin, Gyeonggi-Do (KR)

(*) Notice: Subject to any disclaimer, the term of this patent is extended or adjusted under 35 U.S.C. 154(b) by 370 days.

(21) Appl. No.: 12/970,081

(22) Filed: Dec. 16, 2010

(65) Prior Publication Data

US 2012/0038605 A1 Feb. 16, 2012

(30) Foreign Application Priority Data

Aug. 11, 2010 (KR) .................. 10-2010-0077314

(51) Int. Cl.
*G09G 3/30* (2006.01)

(52) U.S. Cl.
USPC ............... 345/76; 345/82; 345/211; 345/690; 315/169.1; 315/169.3; 315/291

(58) Field of Classification Search
USPC ............... 345/76–83, 211–213, 690–693; 315/169.1–169.3
See application file for complete search history.

(56) References Cited

U.S. PATENT DOCUMENTS

| 8,054,258 B2* | 11/2011 | Choi et al. | 345/82 |
| 2005/0280614 A1* | 12/2005 | Goh | 345/76 |
| 2007/0024541 A1* | 2/2007 | Ryu et al. | 345/76 |
| 2009/0174699 A1 | 7/2009 | Fish et al. | |

FOREIGN PATENT DOCUMENTS

| KR | 10-2006-0064194 | 6/2006 |
| KR | 10-0645696 | 11/2006 |
| KR | 10-0669727 | 1/2007 |

* cited by examiner

*Primary Examiner* — Quan-Zhen Wang
*Assistant Examiner* — Jennifer Nguyen
(74) *Attorney, Agent, or Firm* — Robert E. Bushnell, Esq.

(57) ABSTRACT

A pixel, for displaying an image of desired brightness, includes an organic light emitting diode (OLED); a first transistor for controlling an amount of current supplied from a first power source to the organic light emitting diode; a capacitor having a first terminal coupled to a first node as a gate electrode of the first transistor; a plurality of second transistors coupled between a second node as a second terminal of the capacitor and a data line and turned on when a scan signal is supplied to a scan line; another capacitor having a terminal coupled to the second node; and for compensating inferiority of the OLED in displaying an image of desired brightness, a compensator coupled to the plurality of second transistors and a predetermined power source and turned off when a light emission control signal is supplied to a light emission control line.

18 Claims, 12 Drawing Sheets

PIXEL AND ORGANIC LIGHT EMITTING DISPLAY DEVICE USING THE SAME

CLAIM OF PRIORITY

This application makes reference to, incorporates the same herein, and claims all benefits accruing under 35 U.S.C §119 from an application entitled PIXEL AND ORGANIC LIGHT EMITTING DISPLAY DEVICE USING THE SAME earlier filed in the Korean Industrial Property Office on Aug. 11, 2010, and there duly assigned Serial No. 10-2010-0077314 by that Office.

BACKGROUND OF THE INVENTION

1. Field of the Invention

The present invention relates to a pixel and an organic light emitting display device using the same, and more particularly, to a pixel for displaying an image of a desired brightness and an organic light emitting display device using the same.

2. Description of the Related Art

Recently, various flat panel displays capable of reducing weight and volume that are disadvantages of cathode ray tubes (CRT) have been developed. The flat panel displays include a liquid crystal display (LCD), a field emission display (FED), a plasma display panel (PDP), and an organic light emitting display device.

Among the flat panel displays, the organic light emitting display device displays an image using organic light emitting diodes (OLED) that generate light by re-combination of electrons and holes. The organic light emitting display has advantages of a high response speed and of being driven with low power consumption.

However, the conventional organic light emitting display device cannot display an image of a desired brightness due to change of efficiency caused by inferiority of the OLED. In other words, the OLED is inferior as time goes by and cannot display an image of desired brightness. Actually, light of low brightness is generated as the OLED is inferior.

SUMMARY OF THE INVENTION

Accordingly, the present invention has been made to provide a pixel capable of displaying an image of desired brightness and an organic light emitting display device using the same.

In order to achieve the foregoing and/or other aspects of the present invention, according to an embodiment of the present invention, there is provided a pixel including: an organic light emitting diode; a first transistor for controlling an amount of current supplied from a first power source to the organic light emitting diode; a first transistor for controlling an amount of current supplied from a first power source to the organic light emitting diode; a first capacitor coupled between a first node and the first power source, the first capacitor charging a voltage corresponding to a threshold voltage of the first transistor; a second capacitor having a first terminal coupled to a first node as a gate electrode of the first transistor; a plurality of second transistors coupled between a second node as a second terminal of the second capacitor and a data line and turned on when a scan signal is supplied to an nth (n is a natural number) scan line; a third capacitor having a first terminal coupled to the second node; and a plurality of third transistors coupled between a third node as a second terminal of the third capacitor and a predetermined power source and turned off when a second light emission control signal is supplied to a second light emission control line; wherein a first common terminal between the second transistors and a second common terminal of the third transistors are electrically coupled to each other.

Preferably, turn-on times of the second transistors and the third transistors are not overlapped with each other. A voltage of the predetermine power source is set to a voltage higher than a voltage applied to the organic light emitting diode. A voltage of the predetermined power source is set to a voltage lower than a voltage applied to the organic light emitting diode.

The pixel further includes a fourth transistor coupled between the third node and an anode electrode of the organic light emitting diode and turned on when the scan signal is supplied to the nth scan line; a fifth transistor coupled between a second electrode of the first transistor and the first node and turned on when the scan signal is supplied to an (n-3)th scan line; a sixth transistor coupled between a reference power source and the second node and turned on when the scan signal is supplied to the (n-3)th scan line; and an eighth transistor coupled between a second electrode of the first transistor and the organic light emitting diode and turned off when a light emission control signal is supplied to a first light emission control line. The eighth transistor is turned off after the fifth transistor is turned on. The pixel further includes a seventh transistor coupled between the first node and an initial power source and turned on when the scan signal is supplied to an (n-6)th scan line. The turn-on times of the fifth transistor and the eighth transistor are not overlapped with each other. The initial power source is set to a voltage lower than the first power source.

In order to achieve the foregoing and/or other aspects of the present invention, according to an embodiment of the present invention, there is provided an organic light emitting display device, including: a scan driver for supplying a scan signal to scan lines, for supplying a first light emission control signal to first light emission control lines, and for supplying a second light emission control signal to second light emission control lines; a data driver for supplying a data signal to data lines; and pixels positioned to be coupled to the scan lines and the data lines; wherein a pixel positioned at an nth (n is a natural number) horizontal line include: an organic light emitting diode; a first transistor for controlling an amount of current supplied from a first power source to the organic light emitting diode; a first transistor for controlling an amount of current supplied from a first power source to the organic light emitting diode; a first capacitor coupled between a first node and the first power source, the first capacitor charging a voltage corresponding to a threshold voltage of the first transistor; a second capacitor having a first terminal coupled to a first node as a gate electrode of the first transistor; a plurality of second transistors coupled between a second node as a second terminal of the second capacitor and a data line and turned on when a scan signal is supplied to an nth scan line; a third capacitor having a first terminal coupled to the second node; and a plurality of third transistors coupled between a third node as a second terminal of the third capacitor and a predetermined power source and turned off when a second light emission control signal is supplied to a second light emission control line; wherein a first common terminal between the second transistors and a second common terminal of the third transistors are electrically coupled to each other.

Preferably, a second light emission control signal supplied to an nth second light emission control line is supplied to be overlapped with a scan signal supplied to an (n-3)th scan line to an nth scan line.

According to the pixel of the present invention and the organic light emitting display device using the same, inferiority of OLED can be compensated by controlling voltage of the gate electrode of the driving transistor. In addition, a predetermined power source is supplied between the gate electrode of the first (i.e., driving) transistor and the data line during the period when the OLED emits light so that a uniform image can be displayed. The threshold voltage of the first transistor can be compensated for more than a 1H period (1 horizontal period) and an image of desired brightness can be displayed regardless of the voltage drop of the first power source.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE FIGURES

Figure 1:
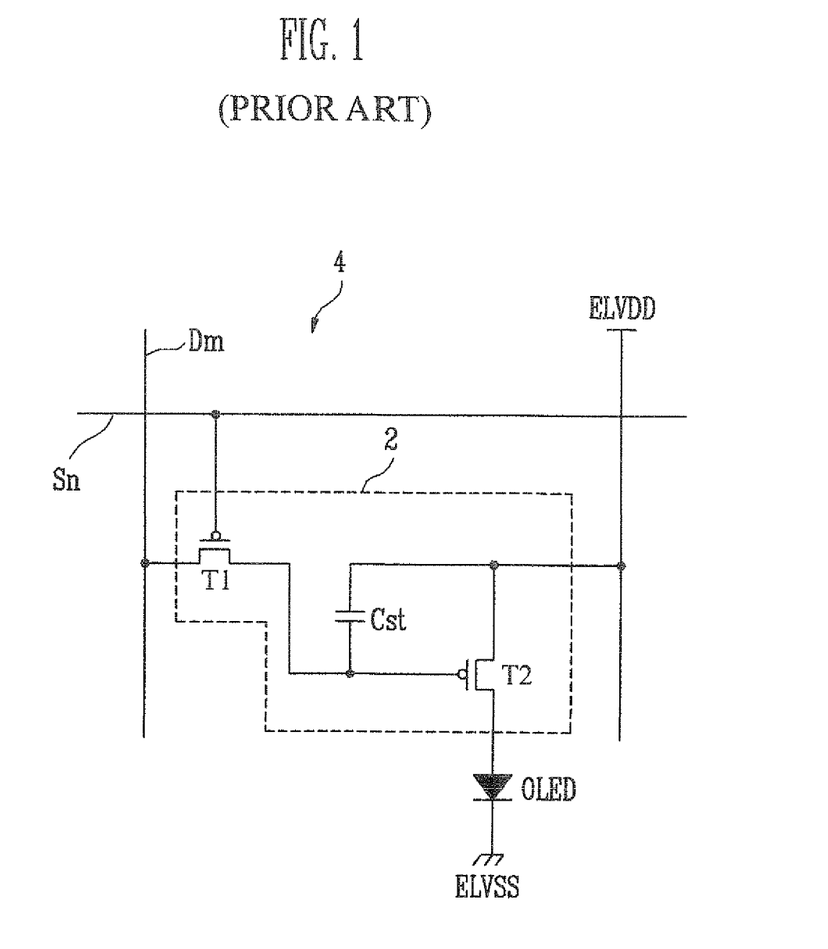
FIG. 1 is a circuit diagram illustrating a conventional pixel.

FIG. 1 shows a circuit diagram illustrating a pixel of an existing OLED as similarly illustrated by Hong Kwon Kim in U.S. Pat. No. 7,193,370.

Referring to FIG. 1, a pixel 4 of an existing organic light emitting display device includes an organic light emitting diode OLED and a pixel circuit 2 coupled to a data line Dm includes and a scan line Sn and controlling the OLED.

The pixel circuit 2 responses a data signal supplied to the data line Dm and controls the amount of current supplied to the OLED when a scan signal is supplied to the scan line Sn. To this end, the pixel circuit 2 includes a second transistor T2 coupled between a first power source ELVDD and the OLED, a first transistor T1 coupled between the data line Dm, and a storage capacitor Cst coupled between a gate electrode and a first electrode of the second transistor T2.

An anode electrode of the OLED is coupled to the pixel circuit 2 and a cathode electrode thereof is coupled to a second power source ELVSS. The OLED emits light of a predetermined brightness in response to current supplied from the pixel circuit 2.

A gate electrode of the first transistor T1 is coupled to the scan line Sn and a first electrode thereof is coupled to the data line Dm. A second electrode of the first transistor T1 is coupled to an electrode of the storage capacitor Cst. Here, the first electrode is set to one of a source electrode and a drain electrode and the second electrode is set to the other electrode different from the first electrode. The first transistor T1 coupled to the scan line Sn and the data line Dm is turned on when the scan signal is supplied from the scan line Sn and supplies the data signal supplied from the data line Dm to the storage capacitor Cst. At this time, the storage capacitor Cst charges voltage corresponding to the data signal.

A gate electrode of the second transistor T2 is coupled to an electrode of the storage capacitor Cst and a first electrode thereof is coupled to the other electrode of the storage capacitor Cst and the first power source ELVDD. The second electrode of the second transistor T2 is coupled to the anode electrode of the OLED. The second transistor T2 controls the amount of current flowing from the first power source ELVDD to the second power source ELVSS via the OLED in response to the voltage stored in the storage capacitor Cst. At this time, the OLED generates light corresponding to the amount of current supplied from the second transistor T2.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, the embodiments by which those skilled in the art may easily perform the present invention will be described in detail with reference to FIGS. 2 to 13.

Figure 2:
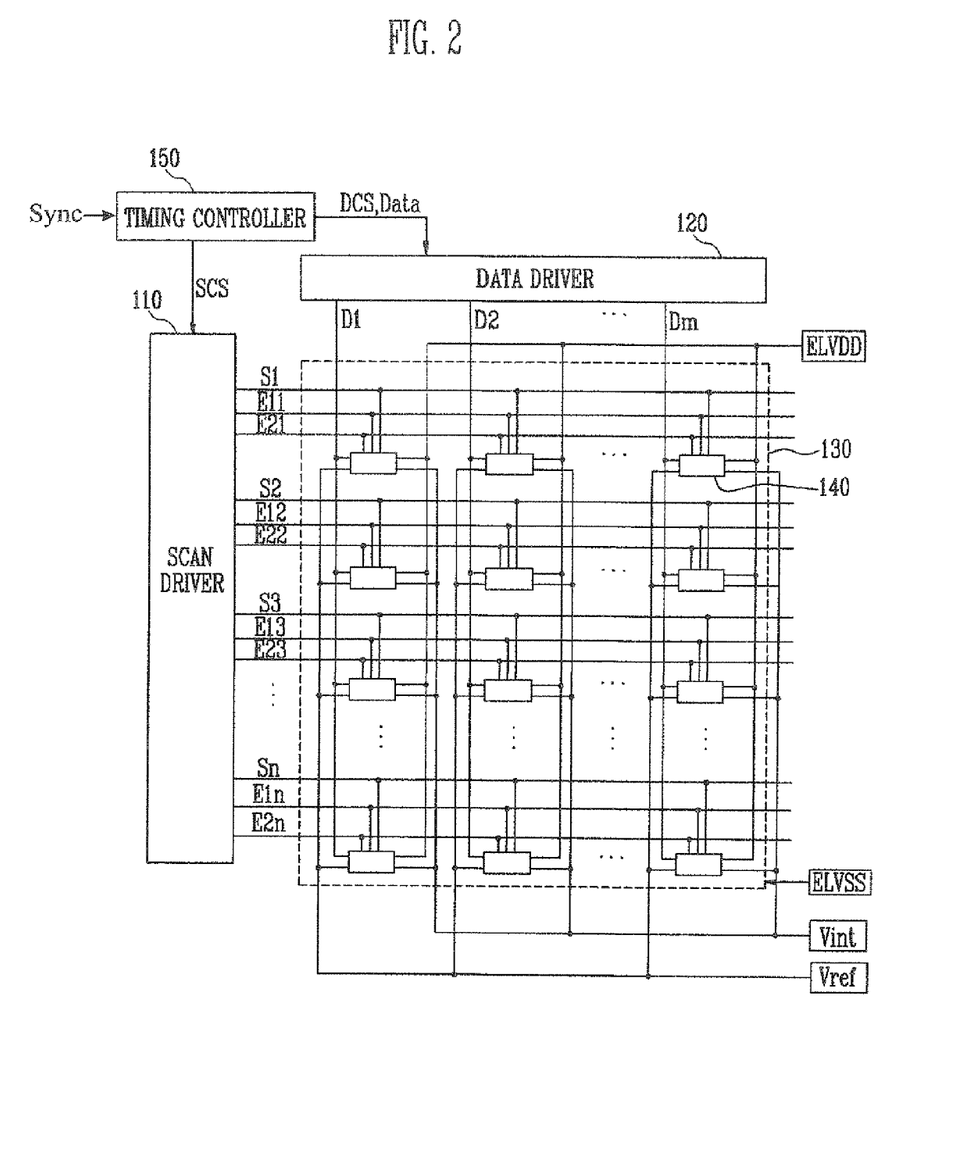
FIG. 2 is a view illustrating an organic light emitting display device according to an embodiment of the present invention.

FIG. 2 is a view illustrating an organic light emitting display device according to an embodiment of the present invention.

Referring to FIG. 2, the organic light emitting display device according to the embodiment of the present invention includes a pixel unit 130 including scan lines S1 to Sn, first light emission control lines E11 to E1n, and a plurality of pixels 140 coupled to second light emission control lines E21 to E2n and data lines D1 to Dm, a scan driver 110 for driving the scan lines S1 to Sn, the light emission control lines E11 to E1n, and the second light emission control lines E21 to E2n, a data driver 120 for driving the data lines D1 to Dm, and a timing controller 150 for controlling the scan driver 110 and the data driver 120.

The pixel unit 130 includes the pixels 140 coupled to the scan lines S1 to Sn and the data lines D1 to Dm. The pixels 140 receives a first power souce ELVDD, a second power source ELVSS, a reference power source Vref, and an initial power source Vint from the exterior. The pixels 140 control the amount of current supplied from the first power source ELVDD to the second power source ELVSS via an organic light emitting diode and generate light of desired brightness in response to a data signal.

The timing control unit 150 generates a data driving control signal DCS and a scan driving control signal SCS in response to synchronizing signals Sync supplied from the exterior. The data driving control signal DCS generated by the timing control unit 150 is supplied to the data driver 120 and the scan driving control signal SCS is supplied to the scan driver 110. The timing control unit 150 supplies data supplied from the exterior to the data driver 120.

Scan driver 110 receives the scan driving control signal SCS and supplies the scan signal (for example, a low voltage) to the scan lines S1 to Sn, a first light emission signal to a first light emission control lines E11 to E1n and a second light emission control signal to the second light emission control lines E21 to E2n.

The data driver 120 receives the data driving control signal DCS from the timing control unit 150, generates a data signal and supplies the generated data signal to the data lines D1 to Dm.

Figure 3:
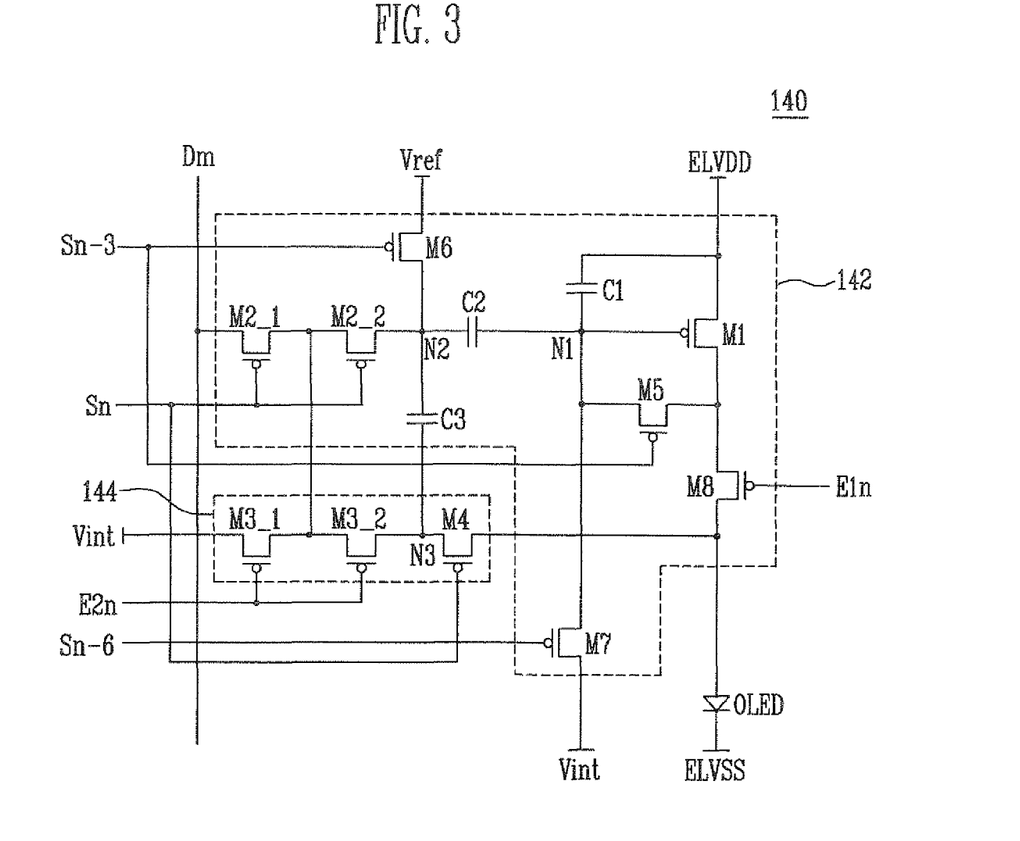
FIG. 3 is a circuit diagram illustrating a pixel according to a first embodiment of the present invention.

FIG. 3 is a circuit diagram illustrating the pixel according to a first embodiment of the present invention.

Shown in FIG. 3 is a pixel 140 positioned at an nth (n is a natural number) horizontal line is coupled to an nth scan line Sn, an (n-3)th scan line Sn-3, and an (n-6)th scan line Sn-6. The pixel 140 positioned at the nth horizontal line is coupled to an nth first light emission control line E1n and an nth second light emission control line E2n.

Here, the second light emission control signal supplied to the nth light emission control line E2n is overlapped with the scan signal supplied to an nth scan line Sn and to the (n-3)th scan line Sn-3. The first light emission control signal supplied to the nth light emission control line E1n is overlapped with a scan signal supplied to the (n-3)th scan line Sn-3 to an (n-6)th scan line Sn-6. Meanwhile, the scan signal supplied to the scan lines S1 to Sn is supplied for a period longer than 1 horizontal period 1H, for example a 3H period.

The pixel 140 according to the first embodiment of the present invention includes an organic light emitting diode OLED, a pixel circuit 142 for controlling the amount of current supplied to the OLED, and a compensator 144 for compensating inferiority of the OLED.

An anode electrode of the OLED is coupled to the pixel circuit 142 and a cathode electrode thereof is coupled to a second power source ELVSS. The OLED generates light of desired brightness in response to the amount of current supplied from the pixel circuit 142.

The pixel circuit 142 controls the amount of current supplied to the OLED. To this end, the pixel circuit 142 includes a first transistor M1, second transistors M2_1 and M2_2, a fifth transistor M5, a sixth transistor M6, a seventh transistor M7, and an eighth transistor M8.

A first electrode of the first transistor (driving transistor) M1 is coupled to the first power source ELVDD and a second electrode thereof is coupled to a first electrode of the eighth transistor M8. A gate electrode of the first transistor M1 is coupled to a first node N1. The first transistor M1 controls the amount of current supplied to the OLED in response to a voltage applied to the first node N1.

The second transistors M2_1 and M2_2 are serially coupled between the data line Dm and a second node N2. Gate electrodes of the second transistors M2_1 and M2-2 are coupled to the nth scan line Sn and are turned on to electrically couple the data line Dm to the second node N2 when the scan signal is supplied to the nth scan line Sn.

A first electrode of the fifth transistor M5 is coupled to a second electrode of the first transistor M1 and a second electrode thereof is coupled to the first node N1. A gate electrode of the fifth transistor M5 is coupled to the (n-3)th scan line Sn-3. The fifth transistor M5 is turned on and couples the second electrode of the first transistor M1 to the first node N1 when the scan signal is supplied to the (n-3)th scan line Sn-3. In this case, the first transistor M1 is coupled in the form of a diode.

A first electrode of the sixth transistor M6 is coupled to the reference power source Vref and a second electrode thereof is coupled to the second node N2. A gate electrode of the sixth transistor M6 is coupled to the (n-3)th scan line Sn-3. The sixth transistor M6 is turned on and supplies the voltage of the reference power source Vref to the second node N2 when the scan signal to the (n-3)th scan line Sn-3. Here, the reference power source Vref is set to a voltage higher than a voltage of a black data signal and lower than a voltage of a white data signal.

A first electrode of the seventh transistor M7 is coupled to the first node N1 and a second electrode thereof is coupled to the initial power source Vint. A gate electrode of the seventh transistor M7 is coupled to the (n-6)th scan line Sn-6. The seventh transistor M7 is turned on and supplies a voltage of the initial power source Vint to the first node N1 when the scan signal is supplied to the (n-6)th scan line Sn-6. Here, the initial power source Vint is set to a voltage lower than the first power source ELVDD, for example a voltage lower than a threshold voltage of the OLED.

A first electrode of the eighth transistor M8 is coupled to the second electrode of the first transistor M1 and a second electrode thereof is coupled to the anode electrode of the OLED. A gate electrode of the eighth transistor M8 is coupled to the first light emission control line E1n. The eighth transistor M8 is turned off when the light emission control signal is supplied to the first light emission control line E1n and is turned on in other cases.

The first capacitor C1 is coupled between the first node N1 and the first power source ELVDD. The first capacitor C1 charges a voltage corresponding to a threshold voltage of the first transistor M1.

The second capacitor C2 is coupled between the first node N1 and the second node N2. The second capacitor C2 charges a voltage corresponding to the data signal and controls the voltage of the first node N1 in response to a rate of change of the voltage of the second node N2.

The compensator 144 compensates the voltage of the second node N2 such that inferiority of the OLED may be compensated. To this end, the compensator 144 includes third transistors M3_1 and M3_2, and a fourth transistor M4.

The third transistors M3_1 and M3_2 are serially coupled between a third node N3 and the initial power source Vint. The third transistors M3_1 and M3_2 are turned on when the light emission control signal is supplied to a second light emission control line E2n and are turned off in other cases. A common node between the third transistors M3_1 and M3_2 is electrically coupled to a common node between the second transistors M2_1 and M2_2. The common nodes of the third transistors M3_1 and M3_2 and the second transistors M2_1 and M2_2 are electrically coupled so that crosstalk can be minimized. This will be described in detail later.

The fourth transistor M4 is coupled between the third node N3 and the anode electrode of the OLED. A gate electrode of fourth transistor M4 is coupled to the nth scan line Sn. The fourth transistor M4 is turned on and electrically couples the third node N3 to the anode electrode of the OLED when the scan signal is supplied to the nth scan line Sn. The turn-on time of the fourth transistor M4 is not overlapped with the turn-on time of the third transistors M3_1 and M3_2.

A third capacitor C3 of pixel circuit 142 is coupled between the second node N2 and the third node N3. The third capacitor C3 controls the voltage of the second node N2 in response to a rate of change of the voltage of the third node N3.

Figure 4:
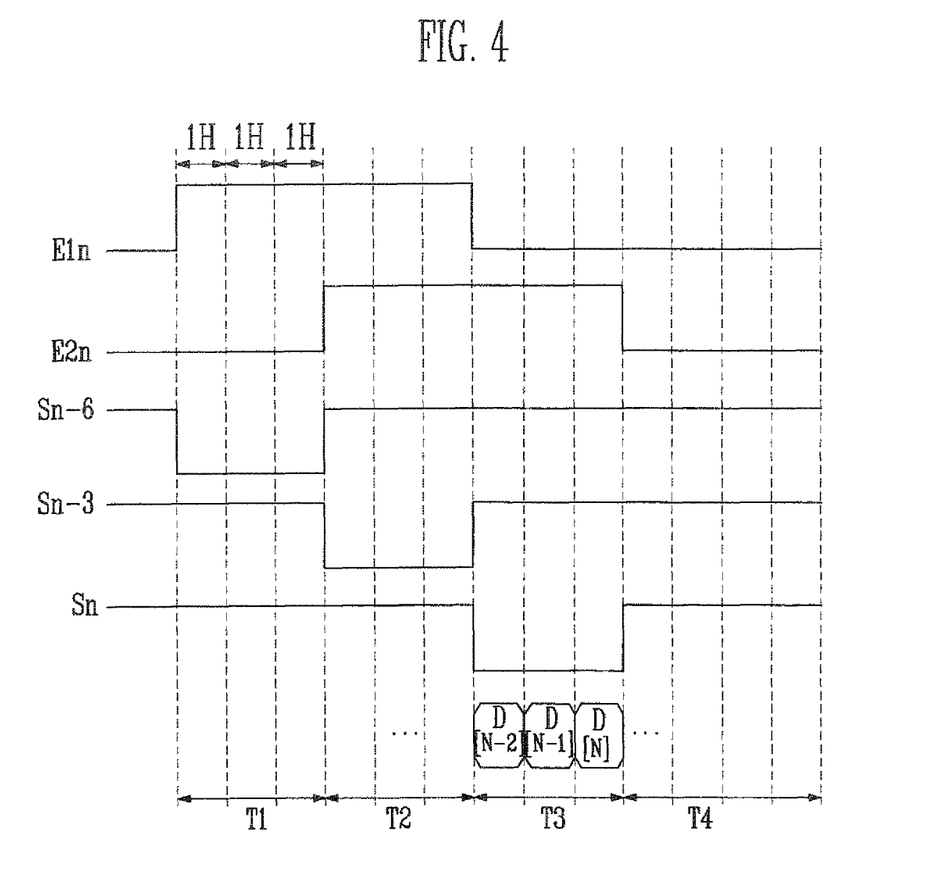
FIG. 4 is a waveform chart illustrating a driving method of the pixel of FIG. 3.

FIG. 4 is a waveform chart illustrating a driving method of the pixel of FIG. 3. It is assumed that the scan signal is supplied for a period of 3H for illustration purpose with respect to FIG. 4.

Referring to FIG. 4, a scan signal is supplied to the (n-6)th scan line Sn-6 for a first period T1. A first light emission control signal is supplied to the first light emission control line E1n for the first period T1 and a second period T2.

When the scan signal is supplied to the (n-6)th scan line Sn-6, the seventh transistor M7 is turned on. When the seventh transistor M7 is turned on, the voltage of the initial power source Vint is supplied to the first node N1.

When the first light emission control signal is supplied to the first light emission control line E1n, the eighth transistor M8 is turned off. When the eighth transistor M8 is turned off, the electrical coupling between the first transistor M1 and the OLED is interrupted. At this time, the OLED is set to a non-light emission state.

Then a scan signal is supplied to the (n-3)th scan line Sn-3 for the second period T2, and a second light emission control signal is supplied to a second light emission control line E2n for the second period T2 and a third period T3.

When the scan signal is supplied to the (n-3)th scan line Sn-3, the fifth transistor M5 and the sixth transistor M6 are turned on. When the sixth transistor M6 is turned on, the voltage of the reference power source Vref is supplied to the second node N2. When the fifth transistor M5 is turned on, the first transistor M1 is coupled in the form of a diode. When the first transistor M1 is coupled in the form of a diode, a voltage in which the threshold voltage of the first transistor M1 is subtracted from the first power source ELVDD is applied to the first node N1. At this time, the first capacitor C1 charges a voltage corresponding to the threshold voltage of the first transistor M1.

Meanwhile, in the present invention, since the second period T2 is set to time of 3H, the voltage in which the threshold voltage of the first transistor M1 is subtracted from the first power source ELVDD is applied to the first node N1 for a sufficient time so that a sufficient compensation time of the threshold voltage can be secured.

When the second light emission control signal is supplied to the second light emission control line E2n, the third transistors M3_1 and M3_2 are turned off. Then, the electrical coupling between the initial power source Vint and the third node N3 is interrupted.

The scan signal is supplied to the nth scan line Sn for the third period T3. When the scan signal is supplied to the nth scan line Sn, the second transistors M2_1 and M2_2 and the fourth transistor M4 are turned on.

When the second transistors M2_1 and M2_2 are turned on, the data line Dm is electrically coupled to the second node N2. When the data line Dm is electrically coupled to the second node N2, the data signal is supplied from the data line Dm to the second node N2. Here, since the second transistors M2_1 and M2_2 are set to a turn-on state for the time of 3H, data signals corresponding to the (n-2)th horizontal line, the (n-1)th horizontal line and the nth horizontal line are sequentially supplied. At this time, when a data signal corresponding to the nth horizontal line is finally applied and then a voltage of a desired data signal is applied to the second node N2.

When the fourth transistor M4 is turned on, the third node N3 is electrically coupled to the is OLED. Then, the voltage applied to the OLED is supplied to the third node N3.

The supply of the second light emission control signal to the second light emission control line E2n is stopped for a fourth period T4. When the supply of the second light emission control signal is stopped, the third transistors M3_1 and M3_2 are turned on. When the third transistors M3_1 and M3_2 are turned on, the voltage of the initial power source Vint is supplied to the third node N3. At this time, the voltage of the third node N3 is dropped from the voltage applied to the OLED to the voltage of the initial power source Vint. When the voltage of the third node N3 is dropped, the voltage of the second node N2 is dropped by the coupling of the third capacitor C3 and the voltage of the first node N1 is dropped by the coupling of the second capacitor C2. At this time, the first transistor M1 controls the amount of current supplied to the OLED in response to the voltage applied to the first node N1.

Meanwhile, the OLED becomes inferior as time goes by. When the OLED is inferior, the voltage applied to the OLED increases in response to the same current. Therefore, a range of the voltage drop of the third node N3 increases as the OLED is inferior. When the range of the voltage drop of the third node N3 increases, range of the voltage drop of the second node N2 and the first node N1 also increase and the inferiority of the OLED may be compensated. In other words, the amount of current supplied from the first transistor M1 to the OLED increases in response to the same data signal as the OLED is inferior, and then the inferiority of the OLED may be compensated.

In addition, the voltage of the initial power source Vint is supplied to the common terminal of the third transistors M3_1 and M3_2 and the second transistors M2_1 and M2_2 for the fourth period T4 when the OLED emits light. In this case, leakage currents flowing from respective second nodes N2 of the pixels 140 to the second transistors M2_1 and M2_2 are set to a same value, and thus the crosstalk can be minimized. Moreover, since gray scale is implemented in response to a voltage difference between the reference power source Vref and the data signal, an image of desired brightness may be displayed regardless of the voltage drop of the first power source ELVDD.

Figure 5:
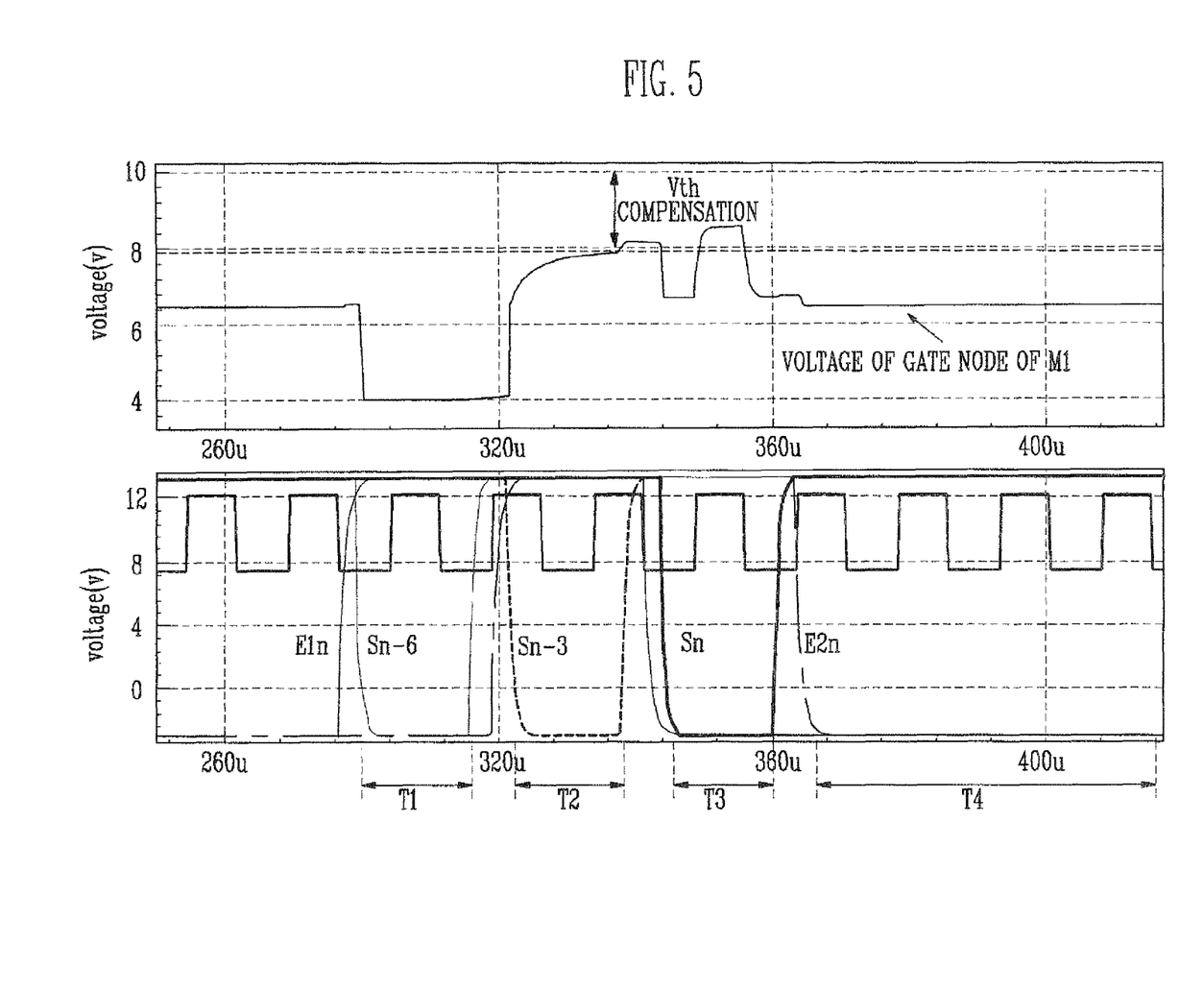
FIG. 5 is a graph illustrating a period of compensating a threshold voltage of the pixel of FIG. 3.

FIG. 5 is a graph illustrating a period of compensating a threshold voltage of the pixel of FIG. 3.

Referring to FIG. 5, in the pixels 140 of the present invention, the threshold voltage of the first transistor M1 is compensated for the second period T2. Here, the second period T2 is set to a period of 3H and then the threshold voltage of the first transistor M1 may be compensated for a sufficient period.

Figure 6:
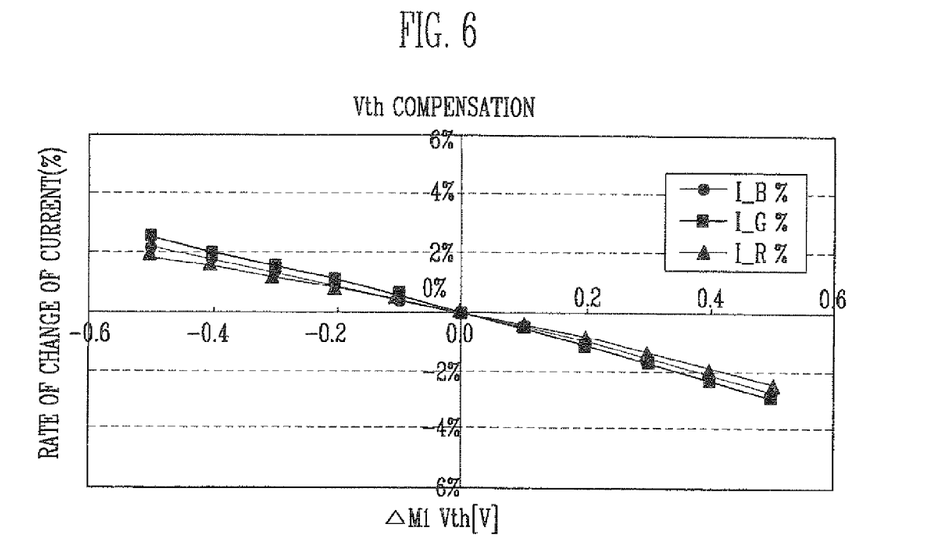
FIG. 6 is a graph illustrating a rate of change of current corresponding to change of a threshold voltage of the pixel in FIG. 3.

FIG. 6 is a graph illustrating a rate of change of current corresponding to change of a threshold voltage of the first transistor.

Referring to FIG. 6, in the pixels 140 of the present invention, current is changed within a range of ±3% when the threshold voltage of the first transistor M1 is changed by ±0.5V. That is, in the present invention, the threshold voltage of the first transistor M1 is effectively compensated.

Figure 7:
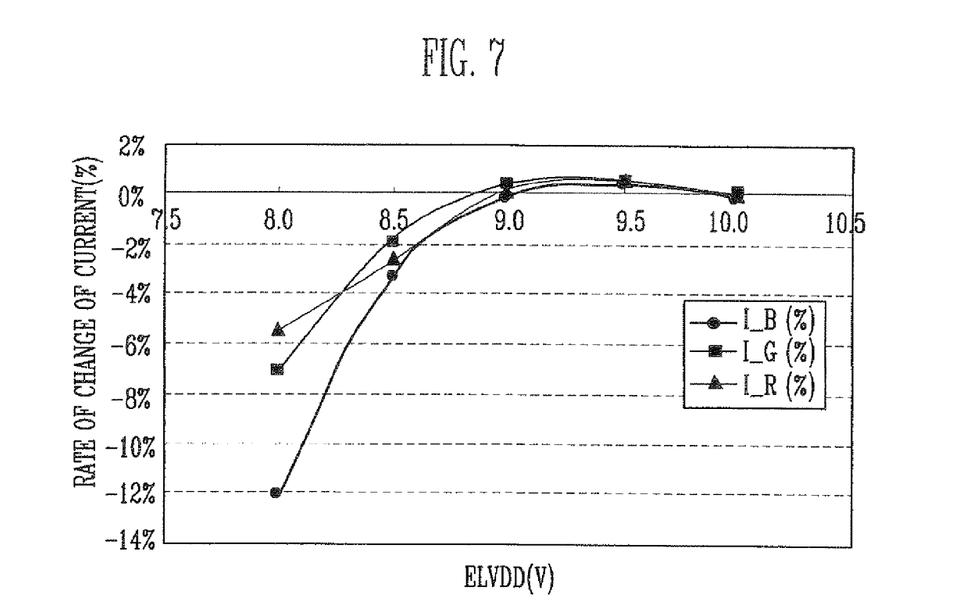
FIG. 7 is a graph illustrating a rate of change of current corresponding to voltage drop of a first power source of the pixel in FIG. 3.

FIG. 7 is a graph illustrating a rate of change of current corresponding to voltage drop of a first power source.

Referring to FIG. 7, in the pixels 140 of the present invention, the rate of change of current is restricted within a range of 12% when the first power source ELVDD drops from 10V to 8V. Particularly, it is understood that the rate of change of current of the pixels 140 is restricted with a range of 1% when the first power source ELVDD is dropped with a range of 1V. That is, in the present invention, the voltage drop of the first power source ELVDD can be efficiently compensated.

Figure 8:
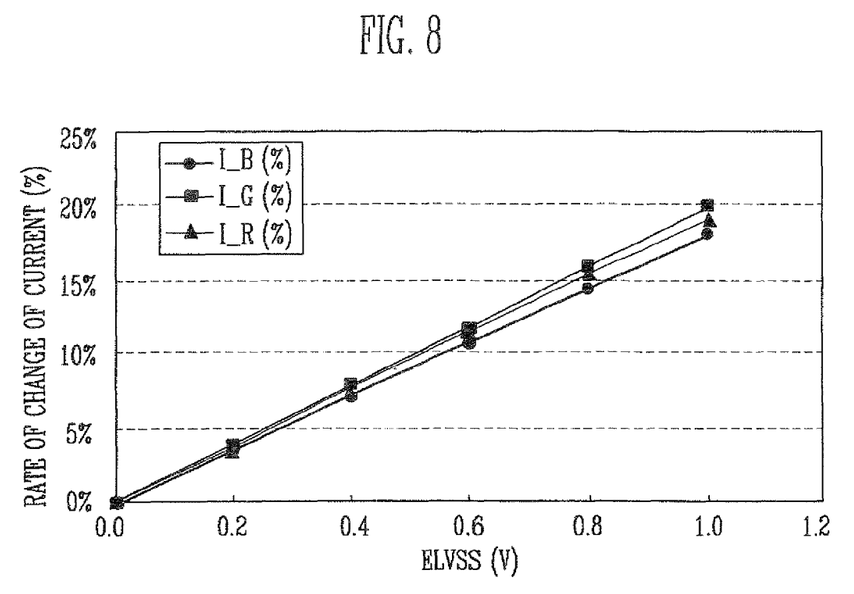
FIG. 8 is a graph illustrating a rate of change of current corresponding to inferiority of organic light emitting diode of the pixel in FIG. 3.

FIG. 8 is a graph illustrating a rate of change of current corresponding to inferiority of the OLED. The rate of change of current is measured by increasing the second power source ELVSS (that is, in correspondence to the inferiority of the OLED).

Referring to FIG. 8, in the pixels 140 of the present invention, current increases as the second power source ELVSS increases, that is, as the OLED is inferior. Actually, when the second power source ELVSS increases by 1V, current increases by about 20%. That is, the current supplied from the first transistor M1 to the OLED increases in response to the inferiority of the OLED and thus the inferiority of the OLED is compensated.

Figure 9:
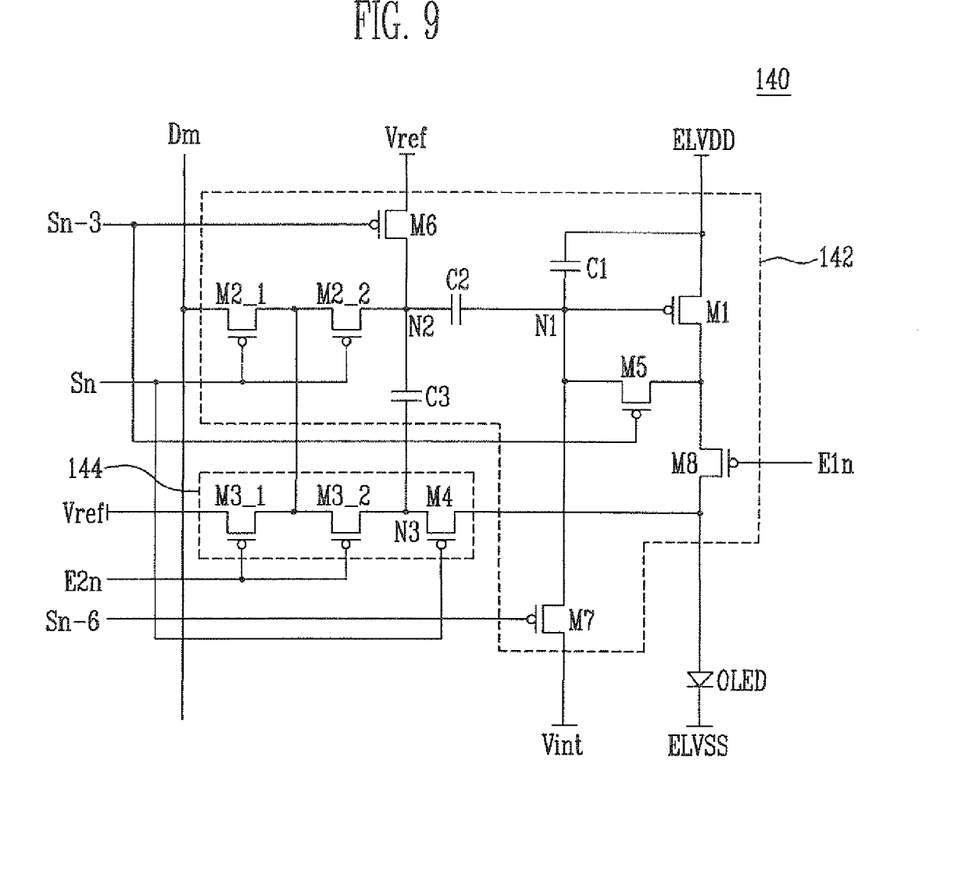
FIG. 9 is a circuit diagram illustrating a pixel according to a second embodiment of the present invention.

FIG. 9 is a circuit diagram illustrating a pixel according to a second embodiment of the present invention. Same or similar reference numerals are assigned to same or elements to those of FIG. 3 and detailed description thereof will be omitted.

Referring to FIG. 9, in the second embodiment of the present invention, the third transistors M3_1 and M3_2 are serially coupled between the reference power source Vref and the third node N3. Here, the reference power source Vref is set to a voltage higher than the voltage applied to the anode electrode of the OLED.

Operation of the pixel will be described briefly. The voltage of the third node N3 increases from the voltage of the OLED to the voltage of the reference power source Vref for the fourth period T4 when the OLED emits light. Here, the voltage applied to the OLED increases as the OLED is inferior so that a range of voltage increase of the third node N3 becomes narrow. The voltages of the first node N1 and the second node N2 change in response to the rate of change of the voltage of the third node N3. Therefore, the range of voltage increase of the first node N1 is narrower as the OLED is inferior so that the amount of current supplied from the first transistor M1 to the OLED increases and the inferiority of the OLED is compensated.

Actually, the third transistors M3_1 and M3_2 of the compensator 144 may be coupled to a voltage source having a voltage higher or lower than the voltage applied to the OLED. The inferiority of the OLED is compensated in response to the range of the voltage increase of the third node N3 in the case of being coupled to the high voltage source, and to the range of voltage decrease of the third node N3 in the case of being coupled to the low voltage source.

Figure 10:
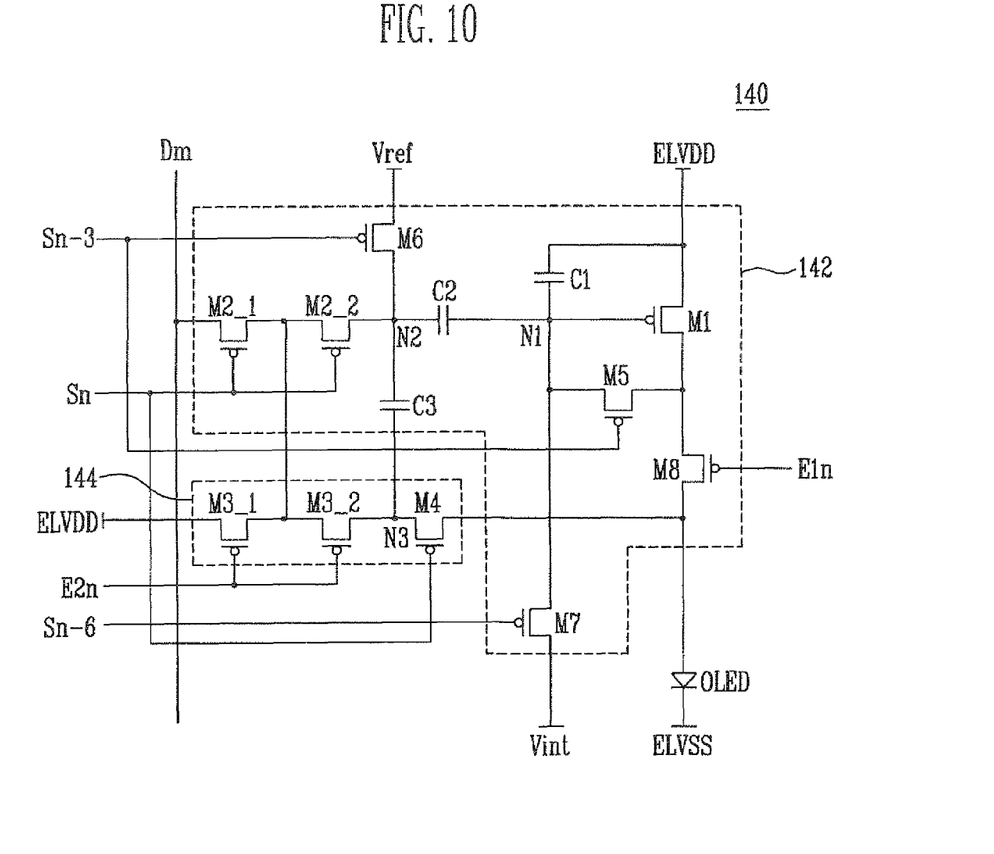
FIG. 10 is a circuit diagram illustrating a pixel according to a third embodiment of the present invention.
Figure 11:
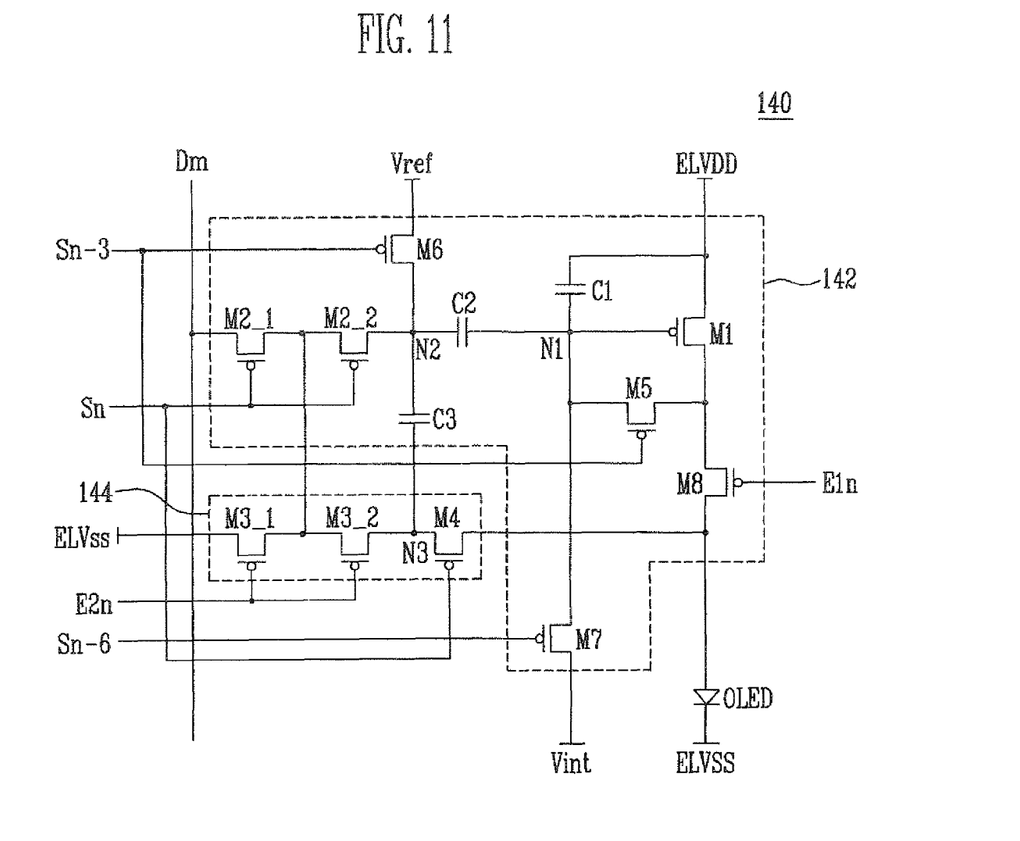
FIG. 11 is a circuit diagram illustrating a pixel according to a fourth embodiment of the present invention.

For example, the third transistors M3_1 and M3_2 of the present invention may be coupled to the first power source ELVDD higher than the voltage applied to the OLED as illustrated in the third embodiment of FIG. 10 or to the second power source ELVSS lower than the voltage applied to the OLED as illustrated in the fourth embodiment of FIG. 11.

Figure 12:
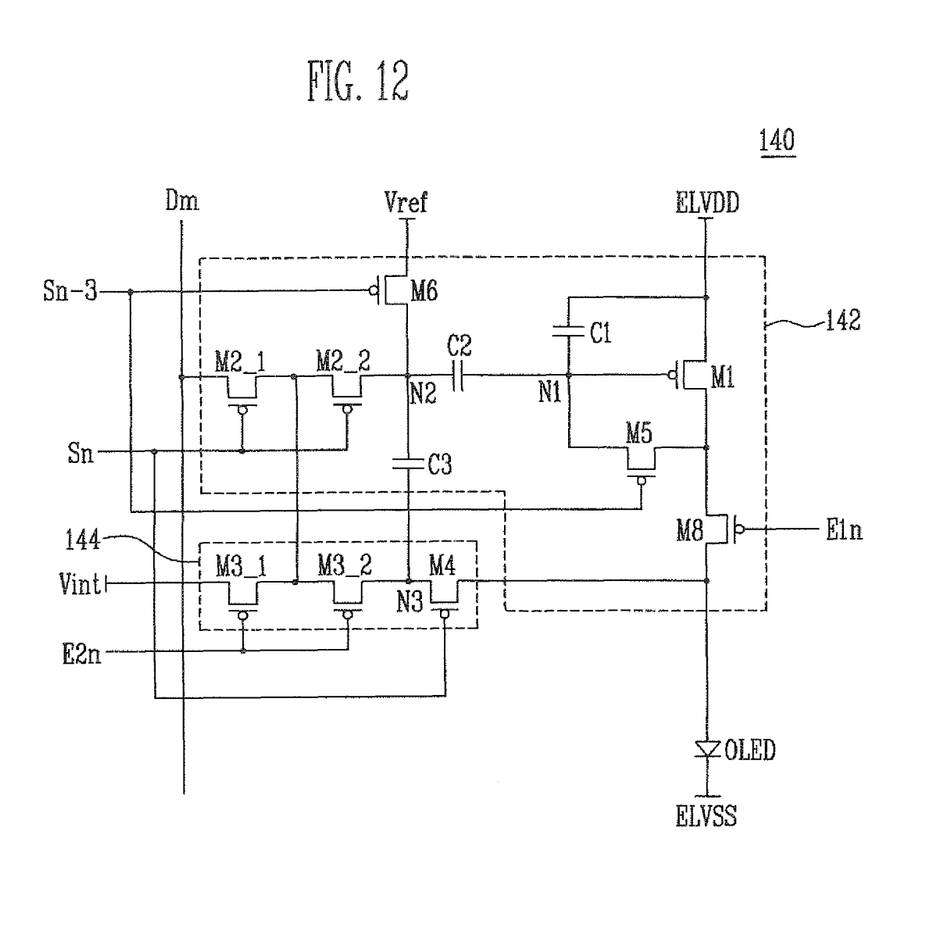
FIG. 12 is a circuit diagram illustrating a pixel according to a fifth embodiment of the present invention.
Figure 13:
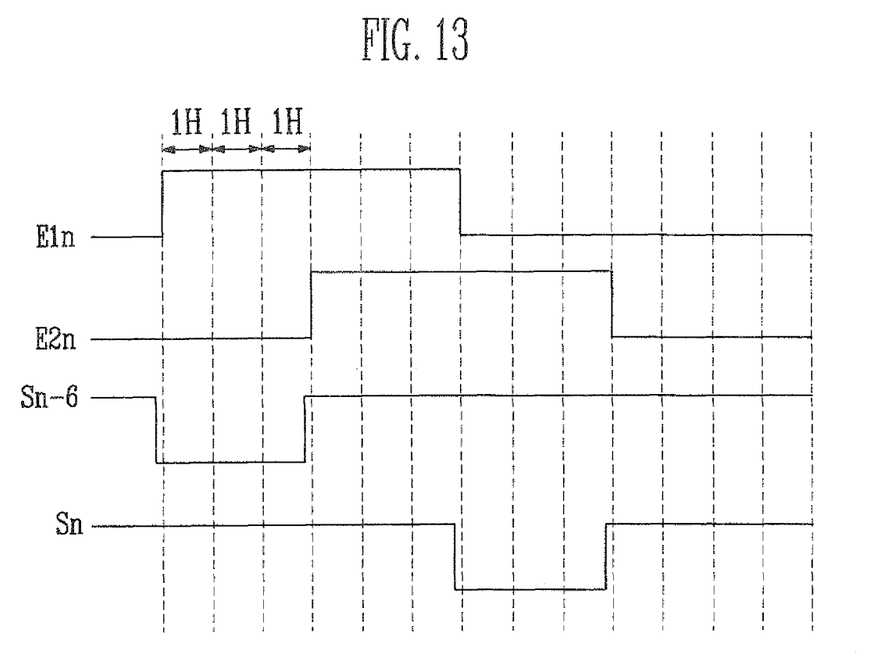
FIG. 13 is a waveform chart illustrating a driving method of the pixel of FIG.

FIG. 12 is a circuit diagram illustrating a pixel according to a fifth embodiment of the present invention. With respect to FIG. 12, same reference numerals are assigned to the same elements as those of FIG. 3 and their descriptions will be omitted.

Referring to FIG. 12, the pixel according to the fifth embodiment of the present invention, in comparison to the pixel of FIG. 3, is the same as the pixel of FIG. 3 except for the absence of seventh transistor M7 coupled to the initial power source Vint. In this case, the voltage of the first node N1 is supplied to the second power source ELVSS via the fifth transistor M5, the eighth transistor M8, and the OLED. At this time, the voltage of the first node N1 is initialized as a similar voltage to the voltage of the second power source ELVSS.

To this end, as illustrated in FIG. 3, the first light emission control signal is supplied to the nth first light emission control line E1n after the scan signal is supplied to the (n-6)th scan line Sn-6. Then, the voltage of the first node N1 is initialized for a period before the first light emission control signal is supplied after the scan signal is supplied to the (n-6)th scan line Sn-6. Since the other operation is identical to the description with reference to FIG. 3, the detailed description will be omitted.

The present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A pixel comprising:
 an organic light emitting diode;
 a first transistor for controlling an amount of current supplied from a first power source to the organic light emitting diode;
 a first capacitor coupled between a first node and the first power source, the first capacitor charging a voltage corresponding to a threshold voltage of the first transistor;
 a second capacitor having a first terminal coupled to the first node as a gate electrode of the first transistor;
 a plurality of second transistors coupled between a second node as a second terminal of the second capacitor and a data line and turned on when a scan signal is supplied to an nth (n is a natural number) scan line;
 a third capacitor having a first terminal coupled to the second node; and
 a plurality of third transistors coupled between a third node as a second terminal of the third capacitor and a predetermined power source and turned off when a second light emission control signal is supplied to a second light emission control line;
 wherein a first common terminal between the second transistors and a second common terminal of the third transistors are electrically coupled to each other.

2. The pixel as claimed in claim 1, wherein turn-on times of the second transistors and the third transistors are not overlapped with each other.

3. The pixel as claimed in claim 1, wherein a voltage of the predetermine power source is set to a voltage higher than a voltage applied to the organic light emitting diode.

4. The pixel as claimed in claim 1, wherein a voltage of the predetermined power source is set to a voltage lower than a voltage applied to the organic light emitting diode.

5. The pixel as claimed in claim 1, further comprising:
 a fourth transistor coupled between the third node and an anode electrode of the organic light emitting diode and turned on when the scan signal is supplied to an nth (n is a natural number) scan line;
 a fifth transistor coupled between a second electrode of the first transistor and the first node and turned on when the scan signal is supplied to an (n-3)th scan line;
 a sixth transistor coupled between a reference power source and the second node and turned on when the scan signal is supplied to the (n-3)th scan line; and
 an eighth transistor coupled between a second electrode of the first transistor and the organic light emitting diode and turned off when a light emission control signal is supplied to a first light emission control line.

6. The pixel as claimed in claim 5, wherein the eighth transistor is turned off after the fifth transistor is turned on.

7. The pixel as claimed in claim 5, further comprising a seventh transistor coupled between the first node and an initial power source and turned on when the scan signal is supplied to an (n-6)th scan line.

8. The pixel as claimed in claim 7, wherein turn-on times of the fifth transistor and the eighth transistor are not overlapped with each other.

9. The pixel as claimed in claim 7, wherein the initial power source is set to a voltage lower than the first power source.

10. An organic light emitting display device, comprising:
a scan driver for supplying a scan signal to scan lines, for supplying a first light emission control signal to first light emission control lines, and for supplying a second light emission control signal to second light emission control lines;
a data driver for supplying a data signal to data lines; and
pixels positioned to be coupled to the scan lines and the data lines;
wherein a pixel positioned at an nth (n is a natural number) horizontal line comprises:
an organic light emitting diode;
a first transistor for controlling an amount of current supplied from a first power source to the organic light emitting diode;
a first transistor for controlling an amount of current supplied from a first power source to the organic light emitting diode;
a second capacitor having a first terminal coupled to a first node as a gate electrode of the first transistor;
a plurality of second transistors coupled between a second node as a second terminal of the second capacitor and a data line and turned on when a scan signal is supplied to an nth scan line;
a third capacitor having a first terminal coupled to the second node; and
a plurality of third transistors coupled between a third node as a second terminal of the third capacitor and a predetermined power source and turned off when a second light emission control signal is supplied to a second light emission control line;
wherein a first common terminal between the second transistors and a second common terminal of the third transistors are electrically coupled to each other.

11. The organic light emitting display device as claimed in claim 10, wherein a second light emission control signal supplied to an nth second light emission control line is supplied to be overlapped with a scan signal supplied to an (n-3)th scan line to an nth scan line.

12. The organic light emitting display device as claimed in claim 11, the pixel further comprising:
a fourth transistor coupled between the third node and an anode electrode of the organic light emitting diode and turned on when the scan signal is supplied to the nth scan line;
a fifth transistor coupled between a second electrode of the first transistor and the first node and turned on when the scan signal is supplied to an (n-3)th scan line;
a sixth transistor coupled between a reference power source and the second node and turned on when the scan signal is supplied to the (n-3)th scan line; and
an eighth transistor coupled between a second electrode of the first transistor and the organic light emitting diode and turned off when a light emission control signal is supplied to a first light emission control line.

13. The organic light emitting display device as claimed in claim 12, wherein a first light emission control signal supplied to an nth first light emission control line is supplied to be overlapped with a scan signal supplied to an (n-6)th scan line to the (n-3)th scan line.

14. The organic light emitting display device as claimed in claim 13, wherein a first light emission control signal supplied to the nth first light emission control line is supplied after the scan signal is supplied to the (n-6)th scan line.

15. The organic light emitting display device as claimed in claim 13, the pixel further comprising a seventh transistor coupled between the first node and an initial power source and turned on when the scan signal is supplied to the (n-6)th scan line.

16. The organic light emitting display device as claimed in claim 15, wherein the first light emission control signal supplied to the nth first light emission control line is supplied to the (n-6)th scan line together with the scan signal.

17. The organic light emitting display device as claimed in claim 10, wherein a voltage of the predetermined power source is set to a voltage higher than a voltage applied to the organic light emitting diode.

18. The organic light emitting display device as claimed in claim 10, wherein a voltage of the predetermined power source is set to a voltage lower than a voltage applied to the organic light emitting diode.

* * * * *